(12) United States Patent
Shinoki et al.

(10) Patent No.: US 8,911,847 B2
(45) Date of Patent: Dec. 16, 2014

(54) VACUUM INSULATION MATERIAL AND MANUFACTURING METHOD THEREOF

(71) Applicant: Mitsubishi Electric Corporation, Chiyoda-ku (JP)

(72) Inventors: Toshio Shinoki, Tokyo (JP); Shunkei Suzuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 13/865,753

(22) Filed: Apr. 18, 2013

(65) Prior Publication Data

US 2013/0230684 A1  Sep. 5, 2013

Related U.S. Application Data

(63) Continuation of application No. PCT/IB2011/002897, filed on Oct. 17, 2011.

(30) Foreign Application Priority Data

Oct. 18, 2010  (JP) ................. 2010-233649

(51) Int. Cl.
| | |
|---|---|
| *F16L 59/065* | (2006.01) |
| *E04B 1/80* | (2006.01) |
| *F16L 59/02* | (2006.01) |
| *B32B 37/10* | (2006.01) |
| *F16L 59/08* | (2006.01) |
| *H02P 8/22* | (2006.01) |
| *H02P 8/34* | (2006.01) |

(52) U.S. Cl.
CPC ............... *E04B 1/803* (2013.01); *F16L 59/029* (2013.01); *F16L 59/065* (2013.01); *B32B 37/1018* (2013.01); *F16L 59/024* (2013.01); *F16L 59/08* (2013.01); *H02P 8/22* (2013.01); *H02P 8/34* (2013.01)
USPC ............................................. 428/69

(58) Field of Classification Search
CPC ............................. F16L 59/065; E04B 1/803
USPC .................................................. 428/69
See application file for complete search history.

(56) References Cited

U.S. PATENT DOCUMENTS 3,152,033 A * 10/1964 Black et al. ............... 428/138
5,107,649 A    4/1992 Benson et al.
(Continued)

FOREIGN PATENT DOCUMENTS

| JP | 2736468 | 1/1998 |
| JP | 2000-097390 | 4/2000 |

(Continued)

OTHER PUBLICATIONS

International Search Report mailed Apr. 17, 2012 in PCT/IB11/02897 Filed Oct. 17, 2011.

(Continued)

*Primary Examiner* — Alexander Thomas
(74) *Attorney, Agent, or Firm* — Oblon, Spivak, McClelland, Maier & Neustadt, L.L.P.

(57) ABSTRACT

A vacuum insulation material includes a plurality of convex protrusions provided on a surface of a core material that is present inside of the bent vacuum insulation material when it is used in a bent state, and so that the core material on which the convex protrusions are provided in advance is inserted into an outer covering material and vacuum-sealed with the outer covering material. By reducing a contact area between the convex protrusions and an inner side surface of the outer covering material in contact with the surface on which the convex protrusions are provided, it is possible to reduce a frictional force between the core material and the outer covering material.

17 Claims, 6 Drawing Sheets

(56) References Cited

U.S. PATENT DOCUMENTS

| | | | |
|---|---|---|---|
| 5,157,893 A | 10/1992 | Benson et al. | |
| 5,175,975 A | 1/1993 | Benson et al. | |
| 5,524,406 A * | 6/1996 | Ragland | 52/406.2 |

FOREIGN PATENT DOCUMENTS

| | | |
|---|---|---|
| JP | 2007-205530 | 8/2007 |
| JP | 2008-25750 | 2/2008 |
| JP | 2009-185408 A | 8/2009 |
| JP | 2010-007806 | 1/2010 |
| JP | 2010-43759 A | 2/2010 |
| JP | 2010-096293 | 4/2010 |
| JP | 2011-196392 | 10/2011 |

OTHER PUBLICATIONS

International Search Report issued Feb. 7, 2012, in PCT/JP2011/075360 with English translation.

Japanese Office Action issued Feb. 25, 2014 in Japanese Application No. 2010-233649 with English Translation.

* cited by examiner

VACUUM INSULATION MATERIAL AND MANUFACTURING METHOD THEREOF

FIELD

The present invention relates to a vacuum insulation material that insulates a non-planar object and a manufacturing method thereof.

BACKGROUND

A vacuum insulation material has been widely used as an insulation material to follow the growing energy-saving consciousness because the thermal conductivity of the vacuum insulation material can be largely reduced as compared with that of glass wool. Accordingly, the vacuum insulation material is used not only in a form of a planar shape but also in a form of a curved shape. With this trend, for example, as described in Patent Literature 1, there is a technique in which grooves or unevenness is formed on a vacuum insulation material, which facilitates bending the material into a three-dimensional shape.

As for such a conventional vacuum insulation material, an outer packing material into which a core member is inserted is clamped from top and bottom by using molds, and protrusions are formed on a vacuum insulation material in vacuum (Patent Literature 1).

CITATION LIST

Patent Literature

Patent Literature 1: Japanese Patent Application Laid-open No. 2007-205530 (p. 3 to p. 7, FIG. 4 to FIG. 13)

SUMMARY

Technical Problem

However, in a case of a general vacuum insulation material, a core material constituted by a lump of fibers such as glass wool is vacuum-sealed in an outer covering material, and the fibers of the core material are arranged in directions nearly perpendicular to the thickness direction of the vacuum insulation material so as to improve the heat insulation property of the vacuum insulation material. In the vacuum insulation material described in Patent Literature 1, the protrusions are formed while vacuum-sealing a core material (a core member) with an outer packaging material (an outer covering material). Accordingly, protrusion-formation machining makes the directions of the fibers of the core material (the core member) closer to the thickness direction of the vacuum insulation material. When the directions of the fibers of the core material are closer to the thickness direction of the vacuum insulation material, thermal conduction via the fibers of the core material increases, which often degrades the heat insulation property of the vacuum insulation material.

Furthermore, when the planar vacuum insulation material is bent, a peripheral length difference occurs between the outside (an outer periphery) and the inside (an inner periphery) of the vacuum insulation material. To absorb this peripheral length difference, wrinkles are generated on the outer covering material present inside of the bent planar vacuum insulation material and the core material adjacent to the outer covering material. When deep and large wrinkles are generated on the core material, the directions of the fibers of the core material arranged to be perpendicular to the thickness direction of the vacuum insulation material before the vacuum insulation material is bent are closer to the thickness direction of the vacuum insulation material, and this tendency occasionally degrades the heat insulation property.

The present invention has been achieved to solve the problems described above, and an object of the present invention is to provide a vacuum insulation material having a high heat insulation property even when it is used in a bent state and to provide a manufacturing method of a vacuum insulation material having a high heat insulation property even when it is used in a bent state.

Solution to Problem

There is provided a vacuum insulation material according to an aspect in which a core material including a fiber sheet and having a plurality of convex protrusions formed on one surface is vacuum-sealed with an outer covering material.

There is provided a manufacturing method of a vacuum insulation material according to another aspect including: a step of forming a plurality of convex protrusions on one surface of a fiber sheet; a step of forming a core material by arranging the fiber sheet so that the convex protrusions are located on a surface; and a step of vacuum-sealing the core material with an outer covering material.

Advantageous Effects of Invention

According to the vacuum insulation material of the present invention, it is possible to prevent generation of uneven wrinkles inside of the bent vacuum insulation material even when the vacuum insulation material is bent, and to obtain a vacuum insulation material having a high heat insulation property even when it is used in a bent state.

Furthermore, according to the manufacturing method of a vacuum insulation material of the present invention, it is possible to manufacture a vacuum insulation material having a high heat insulation property even when it is used in a bent state.

DESCRIPTION OF EMBODIMENTS

First Embodiment

Figure 1:
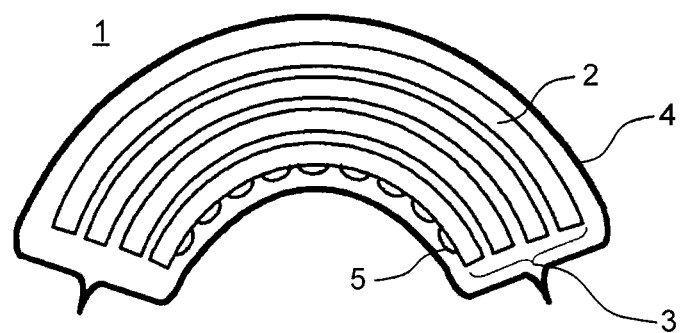
FIG. 1 is a cross-sectional pattern diagram schematically depicting a vacuum insulation material according to a first embodiment of the present invention.

A configuration of a vacuum insulation material according to a first embodiment of the present invention is explained first. FIG. 1 is a cross-sectional pattern diagram of the vacuum insulation material according to the first embodiment. In FIG. 1, a vacuum insulation material 1 is constituted so that a core material 3 in which a plurality of fiber sheets 2 are stacked is covered and vacuum-sealed with an outer covering material 4. A plurality of convex protrusions 5 are formed on the fiber sheet 2 on a surface of the core material 3 that is present inside in a direction of bending the vacuum insulation material 1.

The fiber sheet 2 is constituted so that about 90% is a space and the remaining part is glass fibers. To improve a heat insulation property, the fibers themselves are arranged in parallel to a sheet surface as much as possible. Furthermore, the outer covering material 4 is an aluminum laminate sheet in which an AL (aluminum) foil is sandwiched between a plurality of polymer sheets.

Figure 2:
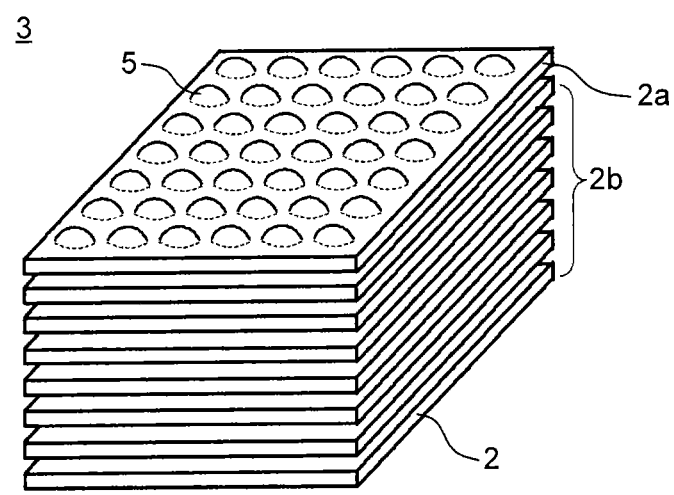
FIG. 2 is a perspective view schematically depicting a core material of the vacuum insulation material according to the first embodiment of the present invention.

FIG. 2 is a perspective view of the core material 3 before the vacuum insulation material 1 according to the present embodiment is bent. In FIG. 2, an upper side of a sheet of FIG. 2 corresponds to the inside of the bent vacuum insulation material 1. As shown in FIG. 2, the core material 3 is constituted by stacking the fiber sheets 2. A fiber sheet 2a with protrusions is arranged in an uppermost portion and a plurality of fiber sheets 2b without protrusions are arranged below the fiber sheet 2a with protrusions.

For example, a thickness of one fiber sheet 2 is about 0.5 millimeter. The convex protrusions 5 formed on the fiber sheet 2 on one surface of the core material 3 that is inside in the bending direction are made of the same glass fibers as those of the fiber sheets 2, and tip ends of the convex protrusions 5 are curved. For example, a height of each of the convex protrusions 5 is about 0.1 to 0.5 millimeter, and a ratio of an area of the convex protrusions 5 to a surface area of the fiber sheet 2 is about 10% to 50%.

As shown in FIG. 2, the convex protrusions 5 are arranged regularly on one surface of the fiber sheet 2. By arranging the convex protrusions 5 regularly in this way, it is possible to prevent large and deep wrinkles from being locally generated when the vacuum insulation material 1 is bent, and fine and shallow wrinkles are generated instead in the bending direction.

A manufacturing method of the vacuum insulation material 1 according to the present embodiment is explained next.

A method of forming the fiber sheets 2 by a paper making method is explained first.

First, large-diameter fibers having a diameter of 4 micrometers to 13 micrometers and small-diameter fibers having a diameter of about 1 micrometer are dispersed in a liquid. Using the liquid, paper is made by an automatic-feed paper machine or the like and then dried, and a sheet roll having a thickness of about 0.5 micrometer is produced. Next, the sheet roll is cut off into sheets each having an area closer to an area of the required vacuum insulation material 1 as the fiber sheets 2. Directions of most of the fibers of the fiber sheets 2 formed by the paper making described above are perpendicular to the thickness direction of the fiber sheets 2.

As the fiber sheet 2b without protrusions, the fiber sheets 2 can be used as they are. As the fiber sheet 2a with protrusions, the fiber sheet 2 can be used by forming the convex protrusions 5 on the fiber sheet 2.

A method of forming the convex protrusions 5 on one surface of the fiber sheet 2 is explained next.

Figure 3:
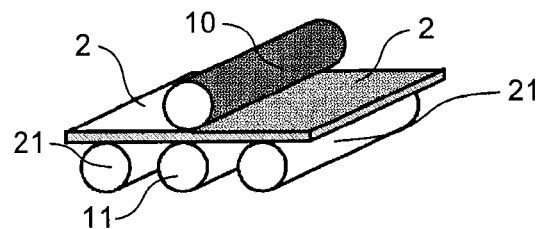
FIG. 3 is a pattern diagram of a method of forming convex protrusions on a fiber sheet of the vacuum insulation material according to the first embodiment of the present invention.

FIG. 3 is a pattern diagram for explaining the method of forming the convex protrusions 5 by putting the fiber sheet 2 for use in the vacuum insulation material 1 between a hot embossing roll 10 and a hot roll 11, the rolls constituting a pressurization mechanism. As shown in FIG. 3, the fiber sheet 2 is moved on rollers 21 and pressed while being heated by passing through a gap of a pressurization mechanism configured by the hot roll 11 and the hot embossing roll 10 set to have a predetermined distance therebetween. The convex protrusions 5 are formed on the surface of the fiber sheet 2 sandwiched between the hot embossing roll 10 and the hot roll 11, thereby producing the fiber sheet 2a with protrusions. The hot embossing roll 10 of a concave shape and the hot roll 11 of a convex shape according to the concave shape can be used. Furthermore, a flat roll without any concave and convex portions can be used as the hot roll 11. Further, the hot roll 11 can be used without being heated.

Figure 4:
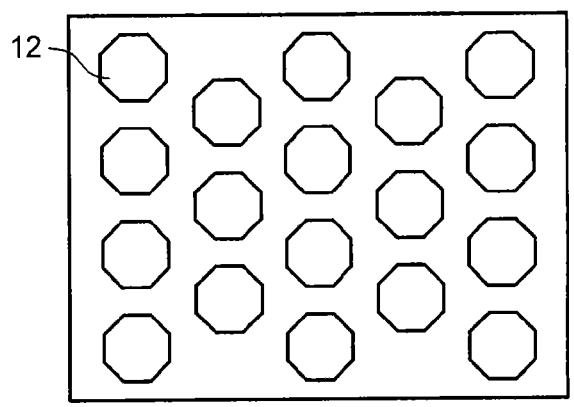
FIG. 4 is a pattern diagram of an example of embossed patterns for forming convex protrusions on a fiber sheet of the vacuum insulation material according to the first embodiment of the present invention.

While embossed patterns formed by the hot embossing roll 10 are not necessarily of a specific shape, for example, it suffices to regularly arrange regular octagonal carved embosses 12 as shown in FIG. 4. FIG. 4 is a pattern diagram of an example of the embossed patterns provided on the hot embossing roll 10. In FIG. 4, patterns of the octagonal embosses 12 are regularly arranged. By curving back sides of the embosses 12 in advance, the concave protrusions 5 having curved tip ends can be formed by being machined by the hot embossing roll 10.

A method of forming the core material 3 is explained next.

Figure 5:
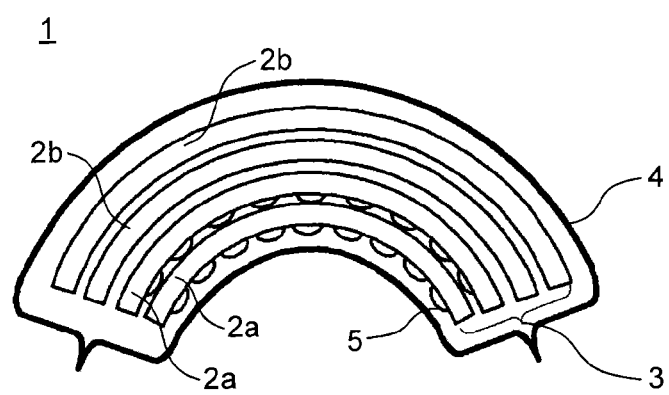
FIG. 5 is a cross-sectional pattern diagram schematically depicting the vacuum insulation material according to the first embodiment of the present invention.

The fiber sheet 2a with protrusions on which the convex protrusions 5 are formed and the fiber sheets 2b without protrusions are stacked, and the fiber sheet 2a with protrusions is arranged so that the convex protrusions 5 are present on one surface, thereby forming the core material 3. As shown in the example of the core material 3 of FIG. 2, the core material 3 can be formed by stacking one fiber sheet 2a with protrusions and a single or a plurality of fiber sheets 2b without protrusions. Alternatively, as shown in a cross-sectional pattern diagram of the vacuum insulation material 1 of FIG. 5, the core material 3 can be formed by stacking a plurality of fiber sheets 2a with protrusions and a single or a plurality of fiber sheets 2b without protrusions. FIG. 5 is a cross-sectional pattern diagram of an example of the vacuum insulation material 1 according to the present embodiment.

In a case of stacking a plurality of fiber sheets 2a with protrusions, it is better to stack the fiber sheets 2a with protrusions so that the convex protrusions 5 do not overlap one another. When the convex protrusions 5 do not overlap one another, then it is possible to decrease the number of contact points between the fiber sheets 2 and to improve the heat insulation property. Further, the stacked fiber sheets 2 are not fixed to each other, therefore, it is possible to facilitate bending.

A method of manufacturing the vacuum insulation material 1 by inserting the core material 3 into the outer covering material 4 is explained next.

Two outer covering sheets (not shown) that become the outer covering material 4 cover upper and lower portions of the core material 3 prepared by the above method or the like, respectively, and the covered core material 3 is arranged into a vacuum chamber. Next, the interior of the vacuum chamber is decompressed to have a predetermined pressure, for example, a vacuum of about 0.1 to 3 pascals. In this state, outer peripheral portions of the outer covering sheets that become the outer covering material 4 are sealed with heat seals. An internal pressure of the vacuum chamber is returned to an atmospheric pressure, and unnecessary parts of the outer covering sheets are cut off. The vacuum insulation material 1 according to the present embodiment can be thereby obtained.

The outer covering material 4 can be made into a bag shape in advance and the remaining opening of the outer covering material 4 can be sealed in the vacuum chamber after inserting the core material 3 into the bag-shaped outer covering material 4. Furthermore, a gas adsorption agent can be inserted into a space covered with the outer covering material 4 as needed.

An internal space of the vacuum insulation material 1 manufactured as described above is held in a vacuum.

Next, the heat insulation property of the vacuum insulation material 1 according to the present embodiment of the present invention manufactured as described above was evaluated.

As the vacuum insulation material 1 having its heat insulation property evaluated, the vacuum insulation material 1 constituted as follows was used. 25 fiber sheets 2 that were produced by making paper out of glass fibers having average fiber diameters of 5 micrometers and 1 micrometer and each of which had a thickness of about 0.5 millimeter were stacked, thereby producing the core material 3. This core material 3 was vacuum-sealed with the outer covering material 4 constituted by the aluminum laminate sheet [15 μm-ONy (stretched nylon)/12 μm-evaporated AL PET (polyethylene terephthalate)/6 μm-AL foil/50 μm PE (non-stretched polyethylene)].

As for the heat insulation property, the heat insulation property of a vacuum insulation material A (the vacuum insulation material according to the present invention) was compared with that of a vacuum insulation material E and the heat insulation property of the vacuum insulation material A was evaluated. As for the vacuum insulation material A, first to eighth fiber sheets 2 from the surface of the core material 3 (inside in the bending direction) were the fiber sheets 2a with protrusions and the remaining 17 fiber sheets 2 were the fiber sheets 2b without protrusions. As for the vacuum insulation material E, the core material 3 was constituted with just the use of the fiber sheets 2b without protrusions. In each of the fiber sheets 2a with protrusions of the vacuum insulation material A, the convex protrusions 5 were formed, at a temperature of a softening point of the material, by pressing the hot embossing roll 10 against the fiber sheet 2. The hot embossing roll 10 had the regular octagonal embosses 12 at a circumscribed circle diameter of 8 millimeters formed into a concave shape with an area ratio of 27%. Furthermore, the fiber sheets 2a with protrusions were stacked so that the convex protrusions 5 were all faced in the same direction.

In a planar state without being bent, thermal conductivities of the vacuum insulation materials A and E were 0.0018 W/mk and 0.0017 W/mk, respectively. In a state of being bent into a cylindrical shape having a radius of curvature of 250 millimeters by a triaxial roll bender, the thermal conductivities of the vacuum insulation materials A and E were 0.0020 W/mk and 0.0025 W/mk, respectively.

As described above, in the case of bending the vacuum insulation material 1 manufactured by vacuum-sealing the core material 3 in which the fiber sheets 2a with protrusions were stacked so that the convex protrusions 5 were located inside, the vacuum insulation material 1 having a high heat insulation property was obtained.

The fiber sheet 2 has a high porosity (a ratio of a space to a volume) and a high elasticity because about 90% of the volume of the fiber sheet 2 is a space and the remaining part thereof is fibers. On the other hand, the outer covering material 4 has almost no elasticity. When the vacuum insulation material 1 is bent, a peripheral length difference occurs between outside (an outer periphery) and the inside (an inner periphery) of the vacuum insulation material 1. Wrinkles are generated inside in the bending direction because the outer covering material 4 outside in the bending direction has almost no elasticity.

According to the vacuum insulation material 1 of the present embodiment of the present invention, it is possible to reduce a contact area between the surface of the core material 3 present inside in the bending direction and an inner side surface of the outer covering material 4. As a result, it is possible to reduce the probability of catching the core material on the outer covering material 4 due to the friction between the core material 3 and the outer covering material 4. Therefore, it is possible to prevent generation of large and deep wrinkles concentrated either at one or several locations inside of the core material 3 when the vacuum insulation material 1 is bent, and to generate small and shallow wrinkles overall uniformly. Angles of the glass fibers of the core material 3 with respect to the thickness direction of the vacuum insulation material 1 are not reduced, and the heat insulation property of the vacuum insulation material 1 can be improved. Furthermore, because the deep and large wrinkles are not generated inside of the vacuum insulation material 1 in the bending direction, it is possible to improve adhesiveness between an insulation target arranged inside of the vacuum insulation material 1 in the bending direction and the outer covering material 4 of the vacuum insulation material 1. It is possible to further improve a heat insulation effect for the insulation target.

Further, according to the vacuum insulation material 1 of the present embodiment of the present invention, it is possible to prevent generation of a local stress on the outer covering material 4. It is also possible to prevent the thin outer covering material 4 from being damaged after the local stress is applied on the outer covering material 4 due to the wrinkles on the core material 3 having deep unevenness, and to prevent holes or portions weak for insulating the air from being generated in the outer covering material 4. Therefore, it is possible to suppress an insulation life from being shortened because of the degradation in the heat insulation property due to a rapid decrease in a degree of vacuum as a result of the damage of the outer covering material 4 of the vacuum insulation material 1 and because of the reduction in the degree of vacuum due to slow leakage of the air via the outer covering material 4 or the heat seals.

In this way, according to the vacuum insulation material of the present embodiment, it is possible to obtain the vacuum insulation material having a high heat insulation property and having a high reliability even when it is used in a bent state. Furthermore, according to the manufacturing method of a vacuum insulation material of the present embodiment, it is possible to easily manufacture the vacuum insulation material having a high heat insulation property and high reliability.

In the present embodiment, while an example in which fibers of the fiber sheets 2 are glass fibers has been described, the fibers of the fiber sheets 2 are not necessarily the glass fibers but fibers of a polymer material such as polyester, polypropylene, or polystyrene can be also used.

When the fibers of the fiber sheets 2 are made of such a polymer material, it suffices to spin fibers by melting resin pellets, extruding the molten resin pellets from a nozzle by using a spunbond manufacturing method, for example, and stretching the extruded resin by an ejector or the like while being cooled. The spun fibers are collected in a belt conveyor and formed into low-weight sheets (thin sheets). Thereafter, the low-weight sheets are partially heat-sealed and formed into a sheet roll by the hot embossing roll 10. By making the embosses 12 of this hot embossing roll 10 have a predetermined shape, the fiber sheets 2a with protrusions can be formed. In this way, even when the fibers are made of the polymer material, the directions of most of the fibers of the fiber sheets 2 can be set perpendicular to the thickness direction of the fiber sheets 2 by making the fiber sheets 2 thin and stacking the thin fiber sheets 2.

Furthermore, in the present embodiment, while the example in which the outer covering material 4 is the aluminum laminate sheet has been described, the outer covering material 4 is not limited to the aluminum laminate sheet but the other material can be used as long as a barrier property can be kept. Furthermore, the thickness of the outer covering material 4 is not limited to that described above. For example, an evaporated alumina film, an evaporated silica film or the like can replace the AL foil or the evaporated AL film in the aluminum laminate sheet [15 μm-ONy (stretched nylon)/12 μm-evaporated AL PET (polyethylene terephthalate)/6 μm-AL foil/50 μm PE (non-stretched polyethylene)] according to the present embodiment. Furthermore, other films can be additionally stacked or conversely the number of types of stacked films can be decreased.

The fiber sheets 2a with protrusions can be also formed by the following method.

Figure 6:
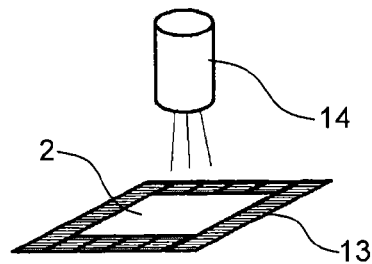
FIG. 6 is a pattern diagram of a method of forming convex protrusions on a fiber sheet of the vacuum insulation material according to the first embodiment of the present invention.

FIG. 6 is a pattern diagram for explaining another method of forming the convex protrusions 5 on each of the fiber sheets 2 for use in the vacuum insulation material 1. As shown in FIG. 6, the fiber sheet 2 is mounted on a mesh 13 having an aperture ratio of about 5% to 30%, and a hot air blower 14 blows hot air on the fiber sheet 2. As a result, portions of the fiber sheet 2 mounted on portions without the mesh 13 are softened and hung downward under the own weight. The portions hung under the own weight become the convex protrusions 5 each having a curved shape. With this configuration, the convex protrusions 5 can be formed on the fiber sheet 2. At this time, a height of the convex protrusions 5 can be adjusted by changing the temperature or flow velocity of the hot air. For example, it suffices that patterns of the mesh 13 are similar to the embossed patterns shown in FIG. 4.

In another alternative, the fiber sheets 2b without protrusions and the fiber sheets 2a with protrusions can be formed by the following method.

Figure 7:
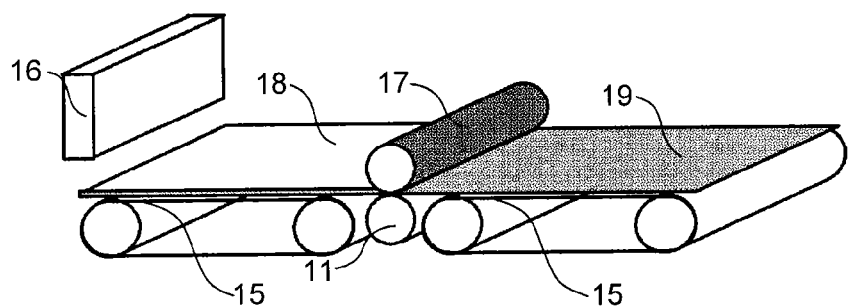
FIG. 7 is a pattern diagram for explaining a manufacturing process of the vacuum insulation material according to the first embodiment of the present invention.

FIG. 7 is a pattern diagram for explaining another method of forming the fiber sheet 2a with protrusions. In FIG. 7, the glass fibers are supplied from a fiber supply unit 16 provided on a belt moving on a belt conveyor 15, and these glass fibers are deposited and formed into a sheet-like pre-pressed fiber sheet 18. For example, from the fiber supply unit 16, glass fibers manufactured such that molten glass is discharged from a nozzle by a centrifugal force and is stretched by combustion gas (by a centrifugal method or the like) right after being discharged are supplied. The pre-pressed fiber sheet 18 is temporarily and preliminarily pressed by a pre-roll (not shown) before being completely solidified, and a press roll 17 in rear of the pre-roll applies a pressure on the pre-pressed fiber sheet 18, thereby forming a sheet roll 19.

At this time, when the patterns of the embosses 12 exemplarily shown in FIG. 4 are formed on the press roll 17, the sheet roll 19 on which the convex protrusions 5 are formed after being molded by the press roll 17 can be obtained. By cutting the sheet roll 19 having the convex protrusions 5 into sheets of a predetermined size, the fiber sheets 2a with protrusions can be obtained.

In this method, the sheet roll 19 without convex protrusions can be formed by replacing the press roll 17 by another press roll without any embossed patterns. By cutting this sheet roll 19 into sheets of a predetermined size, the fiber sheets 2b without protrusions can be obtained.

At this time, with views of securing a sheet tensile strength of the sheet roll 19 and also maintaining the shape of the convex protrusions 5, a binder can be added to the glass fibers for binding the glass fibers in a range of not largely adversely influencing the heat insulation property. The binder is added, for example, at the time of producing the fibers by the centrifugal method or at a stage of the pre-pressed fiber sheet 18. However, in this case, a drying process for fixedly binding the binder is provided after producing the sheet roll 19.

Furthermore, the tip end of each of the convex protrusions 5 is not necessarily curved but a planar portion can be included on the tip end. Further, while an example in which the thickness of one fiber sheet 2 is about 0.5 millimeter has been described above, the thickness of the fiber sheet 2 is not limited thereto, but can be selected appropriately according to the purpose or required performance.

In the manufacturing method of the vacuum insulation material 1 according to the present embodiment, it has been described that the process of forming the convex protrusions 5 on the fiber sheet 2 is separate from the process of forming the fiber sheet 2. However, the convex protrusions 5 can be formed in the drying process included in the process of forming the fiber sheet 2.

Figure 8:
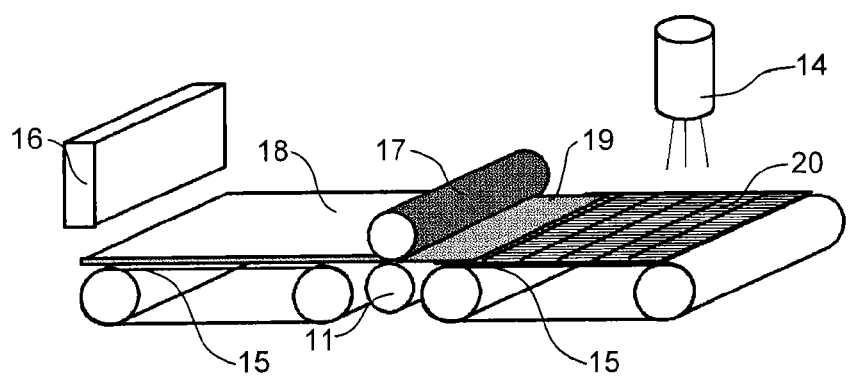
FIG. 8 is a pattern diagram for explaining a manufacturing process of the vacuum insulation material according to the first embodiment of the present invention.

FIG. 8 schematically depicts another manufacturing method of forming the fiber sheet 2.

As shown in FIG. 8, the glass fibers discharged from the fiber supply unit 16 that supplies the glass fibers produced by the centrifugal method are conveyed by a mesh conveyor 20 as the pre-pressed fiber sheet 18, and the pre-pressed fiber sheet 18 is formed to have a predetermined thickness by the press roll 17. Next, the hot air blower 14 blows the hot air on the sheet roll 19 molded to have the predetermined thickness by the press roll 17 from above the mesh conveyor 20. The fiber sheet 2a with protrusions can be thereby produced through almost the same processes as those for a general fiber sheet 2b without protrusions.

Also at the time of manufacturing the fiber sheet 2 shown in FIG. 8, the binder for binding the glass fibers is often added to the glass fibers, for example, at the time of producing the fibers by the centrifugal method or at the stage of the pre-pressed fiber sheet 18 with views of securing the sheet tensile strength of the sheet roll 19 and also maintaining the shape of the convex protrusions 5. Furthermore, with views of making an axial direction of the glass fibers constituting the sheet roll 19 in parallel to a conveyor direction, a process of adding moisture (including steam spraying) to the pre-pressed fiber sheet 18 in advance is often provided. In this case, it is necessary to provide the process of fixedly binding the binder and a drying process of evaporating the added moisture.

Besides the centrifugal method, a drying process is also necessary in the case of the manufacturing method of manufacturing the fiber sheet 2 by the paper making method. In this case, the hot air blower described above also functions to perform the drying process and the fiber sheet 2a with protrusions can be easily formed without any additional devices.

As for the arrangement of the convex protrusions 5 on the fiber sheet 2a with protrusions, when the convex protrusions 5 are arranged in corners of the core material 3 more finely than the other portions, it is possible to prevent the corners of the core material 3 from being caught on the outer covering material 4, and to obtain the vacuum insulation material 1 having a higher heat insulation property and higher reliability.

While an example in which a planar shape of the emboss 12 is a shape such as a hexagon or an octagon, which is closer to a circle, has been described, the planar shape of the emboss 12 is not necessarily closer to a circle but, for example, a diamond shape can be also applied.

Second Embodiment

Figure 9:
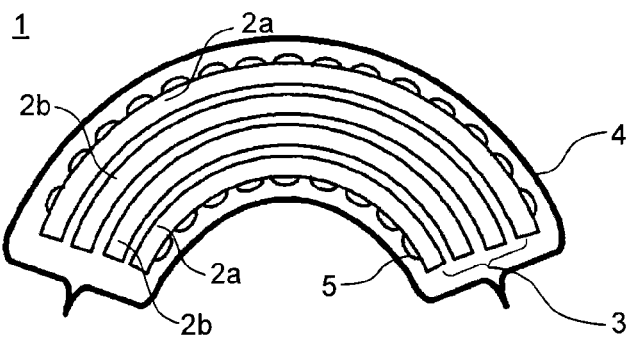
FIG. 9 is a cross-sectional pattern diagram schematically depicting a vacuum insulation material according to a second embodiment of the present invention.

FIG. 9 is a cross-sectional pattern diagram of the vacuum insulation material 1 according to a second embodiment of the present invention. In FIG. 9, the fiber sheets 2a with protrusions are provided on both surfaces (front and rear surfaces) inside and outside in the bending direction of the core material 3, respectively, and the fiber sheets 2b without protrusions are provided inside of the core material 3. Other features of the second embodiment are identical to those of the first embodiment, and thus detailed explanations thereof will be omitted. In the present embodiment, a plurality of fiber sheets 2a with protrusions can be arranged on each of the both surfaces inside and outside in the bending direction of the core material 3.

Furthermore, because the manufacturing method of the vacuum insulation material 1 according to the present embodiment is also identical to the manufacturing method of the vacuum insulation material 1 according to the first embodiment, detailed explanations thereof will also be omitted.

Next, the heat insulation property of the vacuum insulation material 1 according to the present embodiment was evaluated.

As the vacuum insulation material 1 the heat insulation property of which was evaluated, the vacuum insulation material 1 constituted as follows was used similarly to the first embodiment. 25 fiber sheets 2 that were produced by making paper out of glass fibers having average fiber diameters of 5 micrometers and 1 micrometer were stacked, and sealed with the outer covering material 4 constituted by the aluminum laminate sheet [15 μm-ONy (stretched nylon)/12 μm-evaporated AL PET (polyethylene terephthalate)/6 μm-AL foil/50 μm PE (non-stretched polyethylene)].

The heat insulation property of a vacuum insulation material B (the vacuum insulation material according to the present embodiment) constituted so that five fiber sheets 2 from the both surfaces of the core material 3, respectively, were the fiber sheets 2a with protrusions and the remaining 15 fiber sheets 2 were the fiber sheets 2b without protrusions was evaluated. The fiber sheets 2a with protrusions and the fiber sheets 2b without protrusions having specifications identical to those according to the first embodiment were used.

In a planar state without being bent, the thermal conductivity of the vacuum insulation material B was 0.0019 W/mk. In a state of being bent into a cylindrical shape having the radius of curvature of 250 millimeters, the thermal conductivity of the vacuum insulation material B was 0.0019 W/mk.

In this way, according to the vacuum insulation material 1 of the present invention formed by inserting the core material 3 provided with the convex protrusions 5 inside and outside thereof into the outer covering material 4, it is possible to obtain the vacuum insulation material 1 having a higher heat insulation property in a bent state than the vacuum insulation material 1 according to the first embodiment provided with the convex protrusions 5 only inside of the core material 3. By also forming the convex protrusions 5 outside of the core material, a constraint between the core material 3 and the outer covering material 4 is relaxed, and a tensile stress and a bending stress that are conventionally strongly applied on the core material 3 are reduced. The reduced stresses act to prevent the axial direction of the glass fibers from being faced in a stacking direction. It is estimated that the vacuum insulation material 1 having a high heat insulation property in a bent state is obtained. Furthermore, the vacuum insulation material 1 according to the present embodiment has an effect of improving the reliability of the outer covering material 4.

Figure 10:
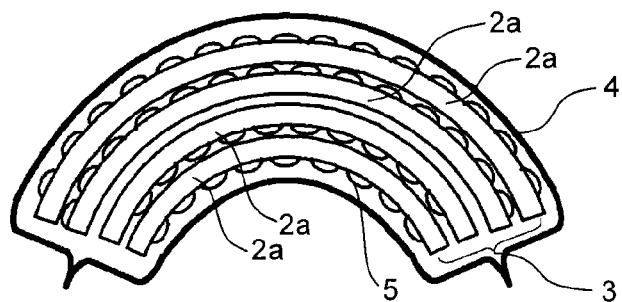
FIG. 10 is a cross-sectional pattern diagram schematically depicting the vacuum insulation material according to the second embodiment of the present invention.

As shown in a cross-sectional pattern diagram of FIG. 10, the core material 3 of the vacuum insulation material 1 according to the present embodiment can be formed using only the fiber sheets 2a with protrusions so that half the fiber sheets 2a with protrusions are stacked inward and the other half thereof are stacked outward.

Figure 11:
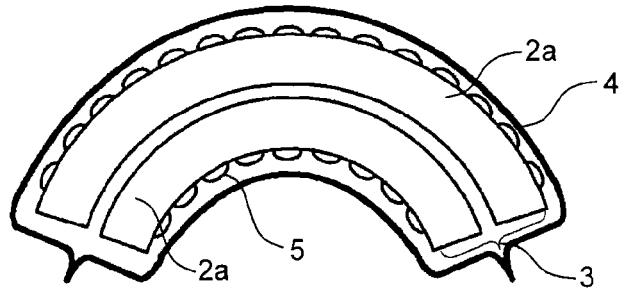
FIG. 11 is a cross-sectional pattern diagram schematically depicting the vacuum insulation material according to the second embodiment of the present invention.

Furthermore, as shown in a cross-sectional pattern diagram of FIG. 11, the core material 3 can be formed by stacking two fiber sheets 2a with protrusions so that the convex protrusions 5 of one of the fiber sheets 2a face inward and those of the other fiber sheet 2a face outward.

In the case of the vacuum insulation material 1 shown in FIG. 11, the thickness of one fiber sheet 2 tends to be large. Therefore, as shown in a pattern diagram of processes of manufacturing the fiber sheet 2 of FIG. 12, a method of manufacturing the sheet roll 19 by supplying the glass fibers produced by the centrifugal method at multiple stages is often adopted.

Figure 12:
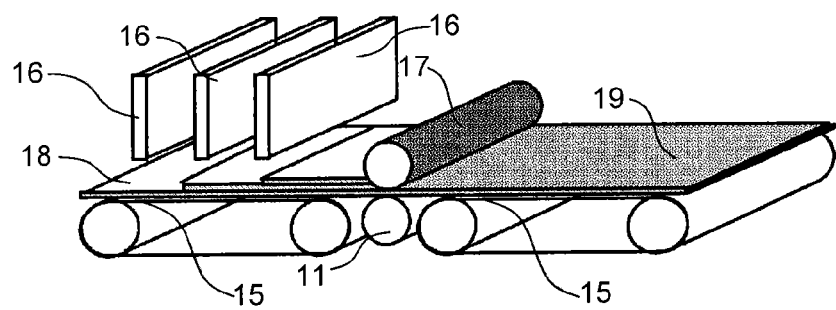
FIG. 12 is a pattern diagram for explaining a manufacturing process of the vacuum insulation material according to the second embodiment of the present invention.

FIG. 12 is a pattern diagram of a method of forming the sheet roll 19 in the manufacturing method of the vacuum insulation material 1 according to the present embodiment. In FIG. 12, the fiber supply units 16 are provided in a plurality of portions, respectively in a moving direction of the belt of the belt conveyor 15, and the sheet roll 19 having characteristics that a plurality of fiber sheets are stacked can be manufactured.

As for the sheet roll 19 manufactured by such a method, the fibers are perpendicular to the thickness direction of the vacuum insulation material 1 in portions of boundaries among the respective stages, so that the heat insulation property can be improved.

According to the sheet-roll formation method by supplying the fibers at the multiple stages as shown in FIG. 12, by arranging glass-fiber discharge units (the fiber supply units 16) at the multiple stages, respectively, a fiber configuration in which a plurality of fiber sheets 2 are substantially stacked even when it appears only one fiber sheet 2 is formed. It is possible to ensure an equivalent property and an equivalent reliability to those in the case of stacking the fiber sheets 2 for a bent shape and to decrease the number of the fiber sheets 2.

In this way, according to the vacuum insulation material 1 of the present embodiment shown in FIGS. 10 and 11, the core material 3 can be manufactured only by stacking the fiber sheets 2a with protrusions having identical specifications while changing directions. Therefore, it is possible to decrease the number of parts, to facilitate manufacturing, and to reduce the manufacturing cost.

In the present embodiment, it has been described that the convex protrusions 5 formed on the fiber sheets 2a with protrusions arranged inside in the bending direction are identical in specifications and arrangement to those formed on the fiber sheets 2a with protrusions arranged outside in the bending direction. The convex protrusions 5 provided inside are not necessarily identical in specifications and arrangement to those provided outside. The convex protrusions 5 in the specifications and arrangement suitable for the inside and outside can be respectively provided.

Furthermore, in this multiple-stage fiber supply method, as shown in FIG. 8, the convex protrusions 5 can be provided by providing the process of adding the binder-adapted sheet or the moisture (including the water vapor spraying) and blowing the hot air on the sheet roll on the mesh conveyor 20 in a drying process.

Third Embodiment

Figure 13:
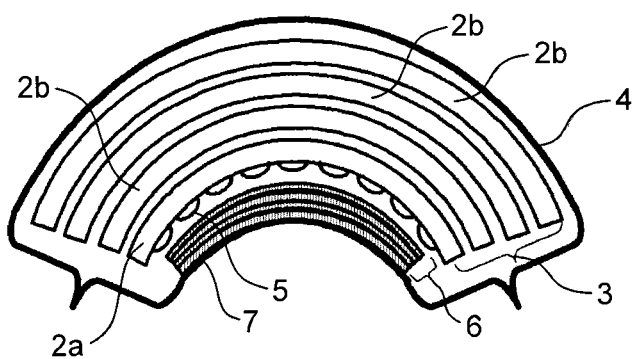
FIG. 13 is a cross-sectional pattern diagram schematically depicting a vacuum insulation material according to a third embodiment of the present invention.

FIG. 13 is a cross-sectional pattern diagram of the vacuum insulation material 1 according to a third embodiment of the present invention. In FIG. 13, the core material 3 of the vacuum insulation material 1 according to the present embodiment is constituted so that one fiber sheet 2a with protrusions is stacked on a surface of a plurality of fiber sheets 2b without protrusions, and the core material 3 is vacuum-sealed with the outer covering material 4. A slip film 6 is arranged while being sandwiched between the fiber sheet 2a with protrusions and the outer covering material 4 inside in the bending direction. The vacuum insulation material 1 according to the present embodiment is identical to the vacuum insulation material 1 according to the first embodiment except that the slip film 6 is arranged between the core material 3 and the outer covering material 4, and therefore detailed explanations thereof will be omitted.

Furthermore, the manufacturing method of the vacuum insulation material 1 according to the present embodiment is also identical to the manufacturing method of the vacuum insulation material 1 according to the first embodiment except that the core material 3 is vacuum-sealed while arranging the slip film 6, and therefore detailed explanations thereof will be omitted.

This slip film 6 is provided between the fiber sheets 2 and the outer covering material 4 inside in the bending direction. The slip film 6 is arranged so as to make the constraint between the stacked fiber sheets 2 having a high porosity and elasticity and the outer covering material 4 that has almost no elasticity during bending less.

The slip film 6 is constituted by stacking a plurality of simple films 7 such as PET films having a low coefficient of friction. It suffices that a thickness of one simple film 7 is equal to or smaller than 100 micrometers. By allowing the simple films 7 to slip on one another, it is possible to suppress generation of a stress between a front side and a rear side of the slip film 6 even when the front side and the rear side thereof are out of alignment from each other. Furthermore, some fibers of the fiber sheets 2 rise at folds of the wrinkles generated as a result of bending the vacuum insulation material 1. However, it is possible to prevent the fibers of the fiber sheets 2 from rising by arranging the slip film 6 between the fiber sheets 2 and the outer covering material 4.

The heat insulation property of the vacuum insulation material 1 according to the present embodiment manufactured as described above was evaluated similarly to the first embodiment.

A vacuum insulation material C obtained by adding the slip film 6 constituted so that four PET films (the simple films 7) each at a thickness of 75 micrometers were stacked to the vacuum insulation material A described in the first embodiment was manufactured.

In a planar state without being bent, the thermal conductivity of this vacuum insulation material C was 0.0017 W/mk. In a state of being bent into a cylindrical shape having the radius of curvature of 250 millimeters, the thermal conductivity of the vacuum insulation material C was 0.0018 W/mk.

In this way, according to the vacuum insulation material 1 of the present embodiment, it is possible to obtain the vacuum insulation material 1 the heat insulation property of which is hardy degraded even when it is used in a bent state because of the insertion of the slip film 6 having the low coefficient of friction between an inner peripheral surface of the core material 3 and the outer covering material 4.

Furthermore, when the inside of the vacuum insulation material 1 bent into a cylindrical shape was observed, wrinkles were generated but unevenness thereof was small.

Further, according to the vacuum insulation material 1 of the present embodiment, the slip film 6 functions as a protection sheet for the outer covering material 4 and it is possible to prevent the outer covering material 4 from being damaged and to improve the reliability because the slip film 6 is provided inside of the bent vacuum insulation material 1.

Figure 14:
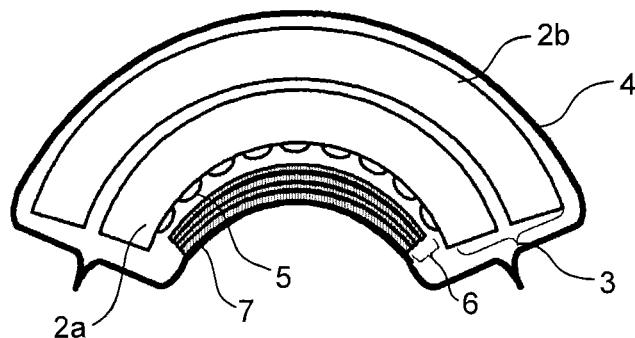
FIG. 14 is a cross-sectional pattern diagram schematically depicting the vacuum insulation material according to the third embodiment of the present invention.

The vacuum insulation material 1 according to the present embodiment is not limited to that shown in the cross-sectional pattern diagram of FIG. 13. For example, as shown in a cross-sectional pattern diagram of FIG. 14, the fiber sheets 2 constituting the core material 3 are constituted by one fiber sheet 2a with protrusions and one fiber sheet 2b without protrusions, that is, constituted by two fiber sheets 2 in all. FIG. 14 is a cross-sectional pattern diagram of the vacuum insulation material 1 according to the third embodiment of the present invention. According to the vacuum insulation material 1, the cross-sectional view of which is shown in FIG. 14, it is possible to decrease the number of parts and to facilitate manufacturing the vacuum insulation material 1.

Furthermore, the slip film 6 is not necessarily of a stacking structure but a film having the same functions can be applied as the slip film 6.

Fourth Embodiment

Figure 15:
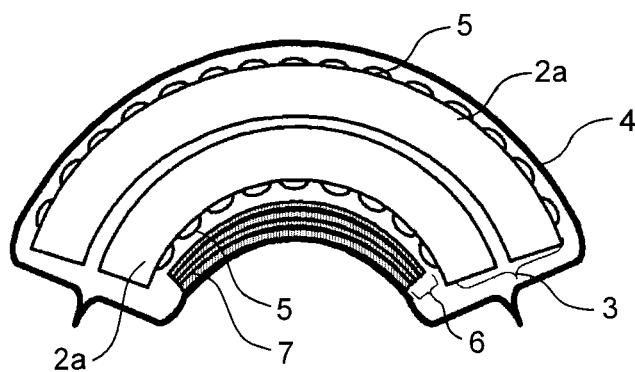
FIG. 15 is a cross-sectional pattern diagram schematically depicting a vacuum insulation material according to a fourth embodiment of the present invention.

FIG. 15 is a cross-sectional pattern diagram of the vacuum insulation material 1 according to a fourth embodiment of the present invention. In FIG. 15, the core material 3 of the vacuum insulation material 1 is constituted by two fiber sheets 2a with protrusions, and the two fiber sheets 2a with protrusions are stacked so that surfaces on which the convex protrusions 5 are not formed are closely attached to each other. Further, the slip film 6 is provided on the inner side surface of the outer covering material 4 inside in the bending direction. Other features of the fourth embodiment are identical to those of the third embodiment, and therefore detailed explanations thereof will be omitted.

Furthermore, the manufacturing method of the vacuum insulation material 1 according to the present embodiment is also identical to the manufacturing method of the vacuum insulation material 1 according to the first to third embodiments, and therefore detailed explanations thereof will be also omitted.

The heat insulation property of the vacuum insulation material 1 according to the present embodiment manufactured as described above was evaluated similarly to the first embodiment.

The heat insulation property of a vacuum insulation material D constituted as shown in FIG. 15 was evaluated. The vacuum insulation material D was configured such that the fiber sheets 2a with protrusions each at a thickness of 6 millimeters were formed by the centrifugal method by supplying the fibers at the multiple stages described with reference to FIG. 12, and these fiber sheets 2a with protrusions and the slip film 6 in which the four PET films each at the thickness of 75 micrometers were stacked were vacuum sealed with the outer covering material 4.

In a planar state without being bent, the thermal conductivity of the vacuum insulation material D was 0.0018 W/mk. In a state of being bent into a cylindrical shape having the radius of curvature of 250 millimeters, the thermal conductivity of the vacuum insulation material D was 0.0018 W/mk.

In this way, according to the present embodiment, even in a case of using in a bent state, the vacuum insulation material 1 exhibits an equivalent heat insulation property to that in a case of using without being bent. Therefore, it is possible to decrease the number of parts and to facilitate manufacturing the vacuum insulation material 1.

Figure 16:
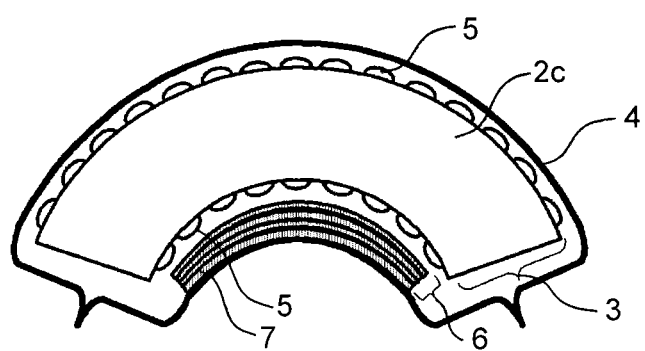
FIG. 16 is a cross-sectional pattern diagram schematically depicting the vacuum insulation material according to the fourth embodiment of the present invention.

The vacuum insulation material 1 according to the present embodiment is not limited to that the cross-sectional pattern view of which is shown in FIG. 15. The vacuum insulation material 1 can be formed by stacking a plurality of fiber sheets 2a with protrusions so as to face half of the fiber sheets 2a with protrusions in a front side direction and to face the other half thereof in a rear side direction. For example, as shown in a cross-sectional pattern diagram of FIG. 16, the fiber sheet 2 constituting the core material 3 can be one fiber sheet 2c with front and rear protrusions having the convex protrusions 5 provided on front and rear sides thereof. The vacuum insulation material 1 can be constituted so that this fiber sheet 2c with front and rear protrusions and the slip film 6 are vacuum-sealed with the outer covering material 4. FIG. 16 is a cross-sectional pattern diagram of the vacuum insulation material 1 according to the fourth embodiment.

For example, the fiber sheet 2c with front and rear protrusions as described with reference to FIG. 16 can be formed by the following method. The sheet roll 19 is produced by the method as described with reference to FIG. 8, and the sheet roll 19 is dried while being pressed by conveyor belts having the same openings from top and bottom when the sheet roll 19 is moved on the belt conveyor 15 in a drying process. In a case of producing one thick fiber sheet 2 similar to the fiber sheet 2c with front and rear protrusions shown in FIG. 16, it is important to take notice that the directions of the fibers are perpendicular to the thickness direction of the vacuum insulation material 1 so as to ensure the heat insulation property. Accordingly, it is preferable to form the fiber sheet 2 having the fiber configuration so that one fiber sheet 2 appears as if a plurality of fiber sheets 2 are substantially stacked by using a device in which the fiber supply units 16 as shown in FIG. 12 are arranged at the multiple stages in a moving direction, respectively.

The vacuum insulation material 1 described in the first to fourth embodiments is a vacuum insulation material on the assumption of being used in a bent state. However, the vacuum insulation material 1 according to the first to fourth embodiment is not necessarily used in a bent state but can be used in a planar state that is a state unchanged since having been manufactured. For example, in a case of vacuum-insulating a structure surrounded by planar and curved surfaces or the like, the vacuum insulation material according to the present invention can be used in a planar portion similarly to a case of being used in a curved portion.

In the embodiments described above, an example of forming the convex protrusions 5 while forming embossed patterns on the press roll 17 in advance has been explained. However, the present invention is not limited thereto. The convex protrusions 5 can be formed by forming embossed patterns on a pressing plate such as a batch-type flat hot press in advance and applying a pressure.

REFERENCE SIGNS LIST

1 vacuum insulation material, 2 fiber sheet, 2a fiber sheet with protrusions, 2b fiber sheet without protrusions, 2c fiber sheet with front and rear protrusions, 3 core material, 4 outer covering material, convex protrusion, 6 slip film, 7 simple film, 10 hot embossing roll, 11 hot roll, 12 emboss, 13 mesh, 14 hot air blower, 15 belt conveyor, 16 fiber supply unit, 17 press roll, 18 pre-pressed fiber sheet, 19 sheet roll, 20 mesh conveyor, 21 roller.

The invention claimed is:

1. A vacuum insulation material comprising:
a core material comprising a stack of a plurality of fiber sheets, the stack including a first fiber sheet having one surface on which a plurality of convex protrusions are formed, wherein the stack is arranged such that the one surface of the first fiber sheet is an outer surface of the core material; and
a flexible outer covering material, wherein the core material is inserted in the outer covering material and is vacuum-sealed in the outer covering material,
wherein the vacuum insulation material is bent so that the one surface of the first fiber sheet on which the convex protrusions are formed is located at a radial inside side of the bend.

2. The vacuum insulation material according to claim 1, wherein the fiber sheets include fiber sheets on which convex protrusions of identical specifications are formed.

3. The vacuum insulation material according to claim 1, wherein the convex protrusions are not formed on the other surface of the first fiber sheet.

4. A vacuum insulation material comprising:
a core material comprising a stack of a plurality of fiber sheets, the stack including a first fiber sheet having one surface on which a plurality of convex protrusions are formed, wherein the stack is arranged such that the one surface of the first fiber sheet is an outer surface of the core material; and
a flexible outer covering material, wherein the core material is inserted in the outer covering material and is vacuum-sealed in the outer covering material, wherein
the fiber sheets include a second fiber sheet including a plurality of convex protrusions formed on one surface, in addition to the first fiber sheet, and
one surface of the second fiber sheet becomes an another outside surface of the core material.

5. The vacuum insulation material according to claim 4, wherein the first and second fiber sheets have surfaces that face one another, and wherein the facing surfaces of the first and second fiber sheets do not have the plurality of convex protrusions.

6. The vacuum insulation material according to claim 4, wherein the fiber sheets include fiber sheets on which convex protrusions of identical specifications are formed.

7. The vacuum insulation material according to claim 4, wherein the convex protrusions are not formed on the other surface of the first fiber sheet.

8. A vacuum insulation material comprising:
a core material comprising a stack of a plurality of fiber sheets, the stack including a first fiber sheet having one surface on which a plurality of convex protrusions are formed, wherein the stack is arranged such that the one surface of the first fiber sheet is an outer surface of the core material; and
a flexible outer covering material, wherein the core material is inserted in the outer covering material and is vacuum-sealed in the outer covering material,
wherein all of the fiber sheets are fiber sheets on one surface of each of which the convex protrusions are formed,
wherein the fiber sheets are stacked so that the one surface of the fiber sheet on which the convex protrusions are formed is faced in an opposite direction halfway in a stacking direction, and is reversely stacked.

9. The vacuum insulation material according to claim 8, wherein the fiber sheets include fiber sheets on which convex protrusions of identical specifications are formed.

10. The vacuum insulation material according to claim 8, wherein the convex protrusions are not formed on the other surface of the first fiber sheet.

11. A vacuum insulation material comprising:
a core material comprising a stack of a plurality of fiber sheets, the stack including a first fiber sheet having one surface on which a plurality of convex protrusions are formed, wherein the stack is arranged such that the one surface of the first fiber sheet is an outer surface of the core material; and
a flexible outer covering material, wherein the core material is inserted in the outer covering material and is vacuum-sealed in the outer covering material,
wherein
the fiber sheets include a configuration of stacking fiber sheets on the one surface of which the convex protrusions are formed to be adjacent to each other, and
the adjacent fiber sheets are stacked so that the convex protrusions do not overlap one another.

12. The vacuum insulation material according to claim 11, wherein the fiber sheets include fiber sheets on which convex protrusions of identical specifications are formed.

13. The vacuum insulation material according to claim 11, wherein the convex protrusions are not formed on the other surface of the first fiber sheet.

14. A vacuum insulation material comprising:
a core material comprising a stack of a plurality of fiber sheets, the stack including a first fiber sheet having one surface on which a plurality of convex protrusions are formed, wherein the stack is arranged such that the one surface of the first fiber sheet is an outer surface of the core material; and
a flexible outer covering material, wherein the core material is inserted in the outer covering material and is vacuum-sealed in the outer covering material,
further comprising a slip film between the one surface of the core material and the flexible outer covering material.

15. The vacuum insulation material according to claim 14, wherein the slip film includes stacked single films.

16. The vacuum insulation material according to claim 14, wherein the fiber sheets include fiber sheets on which convex protrusions of identical specifications are formed.

17. The vacuum insulation material according to claim 14, wherein the convex protrusions are not formed on the other surface of the first fiber sheet.

* * * * *